(12) United States Patent
Chen

(10) Patent No.: US 8,891,027 B2
(45) Date of Patent: Nov. 18, 2014

(54) REMOTE FLIP CEILING DISPLAY

(75) Inventor: Stephen Chen, Changhua (TW)

(73) Assignee: E-Lead Electronic Co., Ltd., Changhua (TW)

( * ) Notice: Subject to any disclaimer, the term of this patent is extended or adjusted under 35 U.S.C. 154(b) by 530 days.

(21) Appl. No.: 13/350,105

(22) Filed: Jan. 13, 2012

(65) Prior Publication Data

US 2013/0182196 A1    Jul. 18, 2013

(51) Int. Cl.
*H04N 5/64* (2006.01)

(52) U.S. Cl.
USPC ............................................. 348/837

(58) Field of Classification Search
USPC ........... 348/837; 340/5.7; 296/37.8; 362/490; 725/75, 76, 80
See application file for complete search history.

(56) References Cited

U.S. PATENT DOCUMENTS

| | | | | |
|---|---|---|---|---|
| 5,179,447 | A * | 1/1993 | Lain | 348/837 |
| 5,193,208 | A * | 3/1993 | Yokota et al. | 725/80 |
| 6,871,356 | B2 * | 3/2005 | Chang | 725/75 |
| 6,918,134 | B1 * | 7/2005 | Sherlock et al. | 725/76 |
| 7,490,887 | B2 * | 2/2009 | Vitito | 296/37.8 |
| 7,894,003 | B2 * | 2/2011 | Chang | 348/837 |
| 2006/0279959 | A1 * | 12/2006 | Yabashi et al. | 362/490 |
| 2007/0132894 | A1 * | 6/2007 | Vitito | 348/837 |
| 2010/0052847 | A1 * | 3/2010 | Mortensen | 340/5.53 |
| 2011/0285501 | A1 * | 11/2011 | Chen | 340/5.7 |

* cited by examiner

*Primary Examiner* — Y Lee
*Assistant Examiner* — Salame Amr
(74) *Attorney, Agent, or Firm* — Guice Patents PLLC

(57) ABSTRACT

A remote flip ceiling display, including a machine body, a display module, a first action side, a second action side, a remote control key and a control module, wherein a control module is increased in the display module of the ceiling display fixed by the original mechanical tab. The driver may press the remote control key of the front audio, to control the control module to push the tab, and the display module is flipped with it for the rear seat passengers to watch.

6 Claims, 17 Drawing Sheets

REMOTE FLIP CEILING DISPLAY

BACKGROUND OF THE INVENTION

1. Field of the Invention

The invention relates to a remote flip ceiling display and, more particularly, a control module is added to the display module of the ceiling display fixed by the original mechanical tab. The driver may press the remote control key of the front audio, to control the control module pushing the tab, and the display module is flipped with it for the rear seat passengers watching.

2. Brief Description of the Related Art

Recently, the multimedia playback system equipped in the car has become the new trends of the basic equipment of a motor car, particularly, the ceiling display has become a mainstream equipment (as shown in FIG. 1). The ceiling display 9 is a flip display module 92 linked to a machine body 91. A slot 921 is set on the edge of the bottom side of the display module 92 for fixing a key 911 with a tab set on the machine body 91, which may fix by using a mechanical tab. The greatest drawback of the ceiling display 9 is that the speed of flipping and closing is very fast and may generate impact and vibration to affect its lifetime. In order to solve the drawbacks, a buffer apparatus for a ceiling screen is provided (please refer to the reference TW 1232188, US2006/0006093A1), wherein a speed reducing mechanism of the corresponding first and second action side are used to match a first elastic element for buffering and leading to achieve the purpose of preventing impact and vibration generated by fast flipping or closing the display module, but the display may not be flipped by remote controlling.

Besides, the multimedia playback system equipped in the car has become the new trends of the basic equipment of a motor car, wherein the video player and the display are respectively installed in different places inside the car, but almost around the range of the front seat, and the operation of installing, connecting and playing video are convenient because of the short distance in between. However, it is not convenient for rear seat passengers to watch, thus, the so-called ceiling video players are provided, which may be separated as two types. One type is the slot load video player, such as the reference of U.S. Des. 451,895 S, and another type is the tray video player. Wherein, it is convenient to place disc in the slot load video player, but the slot-loading mechanism is quite complicated and the cost is high. Otherwise, since the slot load video player is thick, it is not appropriate installed in the car with lower ceiling. Although the tray video player has the advantages of low cost and thin, it is commonly designed under the machine body and the disc should be placed upward. It is not only inconvenient to operate, but also easily to cause disc damage during the putting process due to the gravity and car shaking, and has been criticized widely by users.

SUMMARY OF THE INVENTION

From the abovementioned drawbacks of the conventional devices, in order to remote control flip ceiling display and turn on the display to play films conveniently for the front seat driver, to thereby increase the interaction between the front audio and the display module, the inventor completes to develop the present invention after researching and improving, namely, the object of the invention is to provide a remote flip ceiling display and, more particularly, which adding a control module to the display module of the ceiling display fixed by the original mechanical tab. The driver may press the remote control key of the front audio, to control the control module pushing the tab, and the display module is flipped with it for the rear seat passengers watching

BRIEF DESCRIPTION OF THE INVENTION

The detail structure, the applied principle, the function and the effectiveness of the present invention can be more fully understood with reference to the following description and accompanying drawings, in which.

DETAILED DESCRIPTION OF THE PREFERRED EMBODIMENTS

Figure 1:
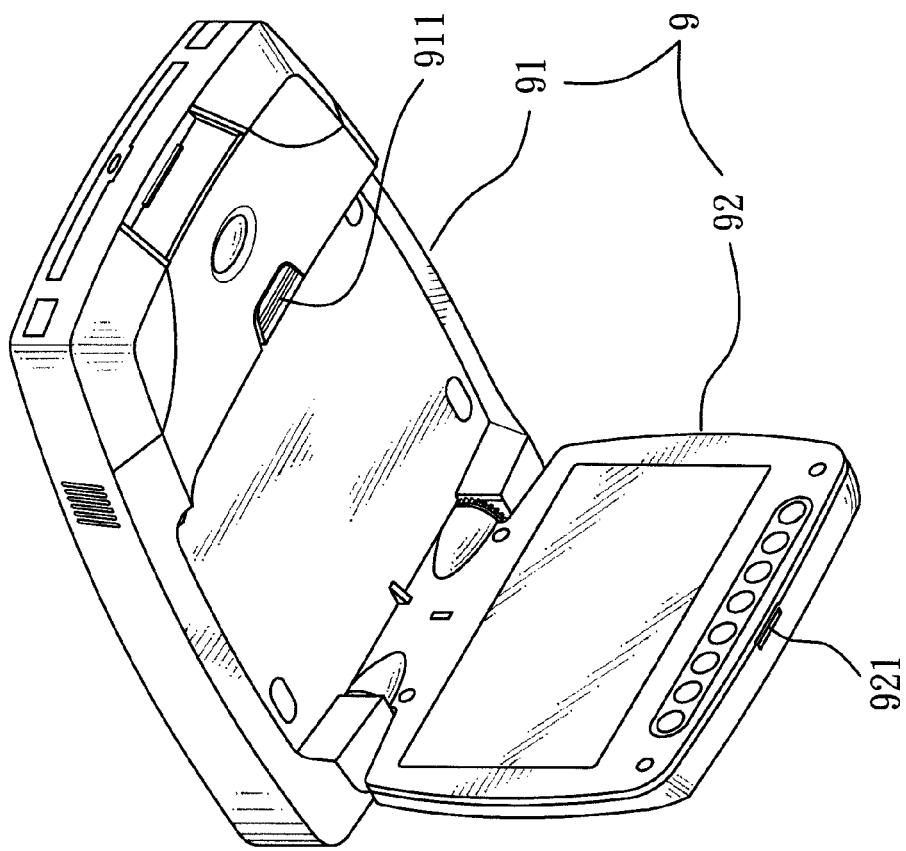
FIG. 1 is a schematic diagram of a conventional device.
Figure 2:
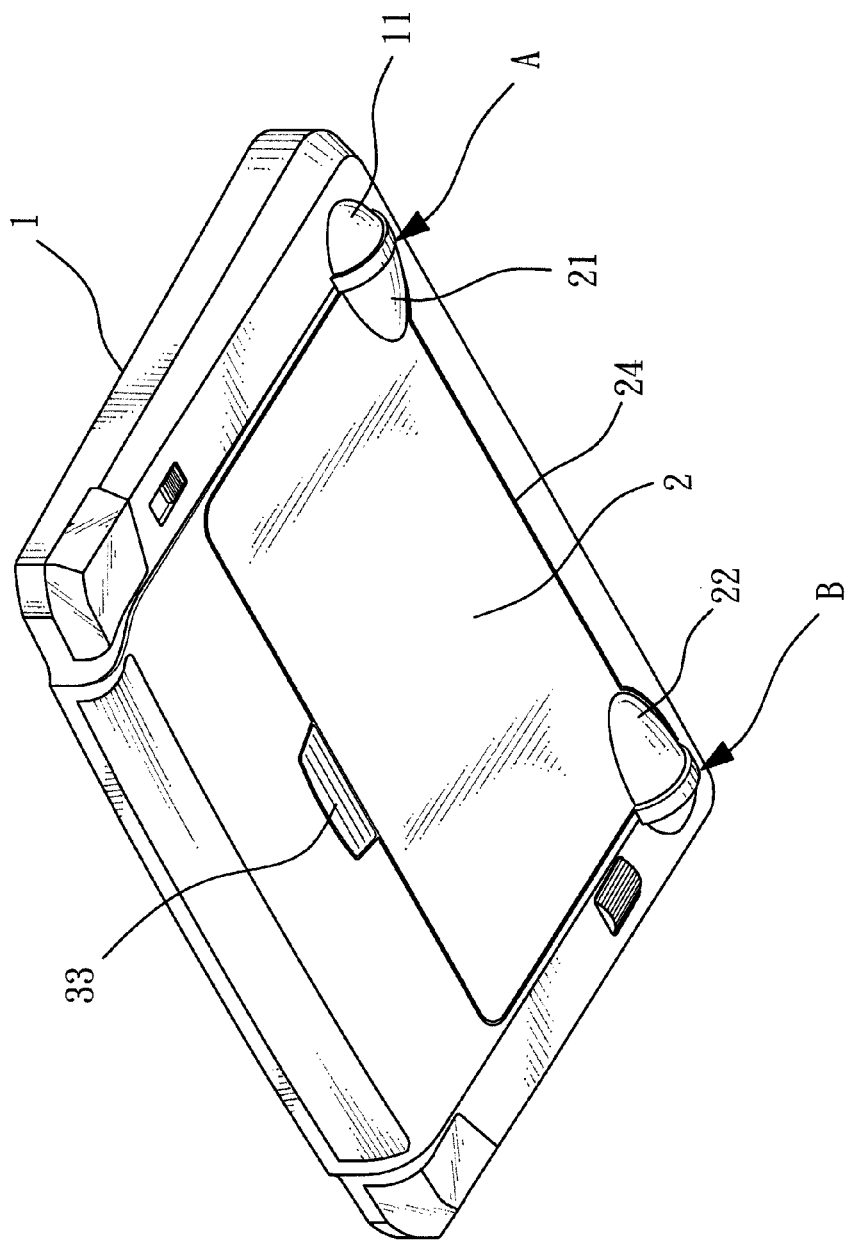
FIG. 2 is a schematic diagram of closing the display module according to the present invention.
Figure 3:
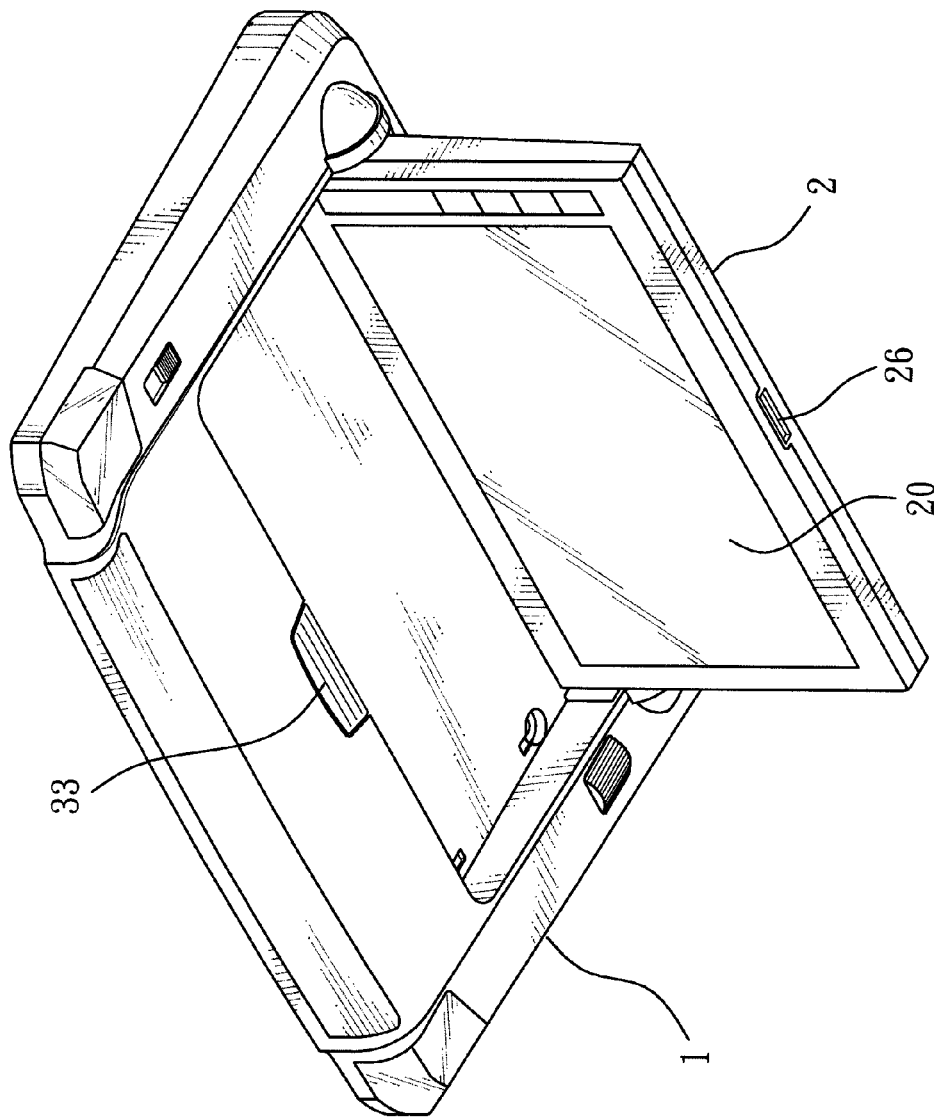
FIG. 3 is a schematic diagram of flipping the display module according to the present invention.
Figure 4:
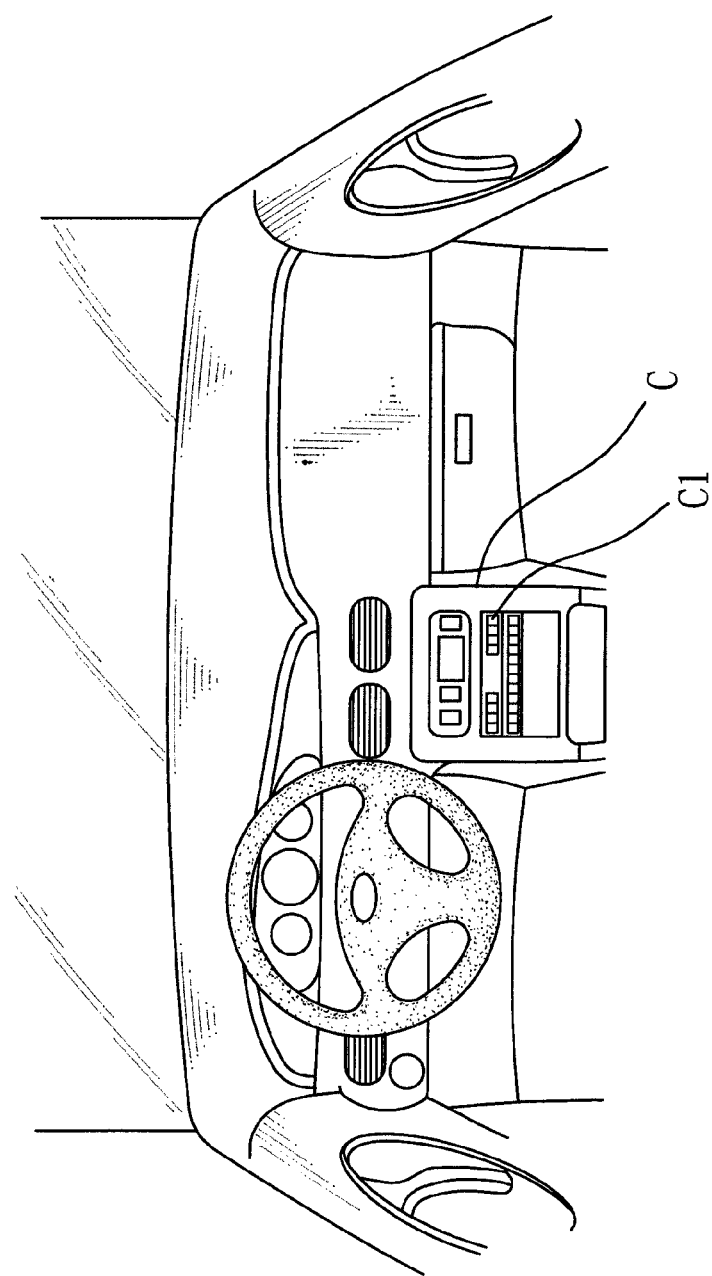
FIG. 4 is a schematic diagram of the remote control key according to the present invention.
Figure 5:
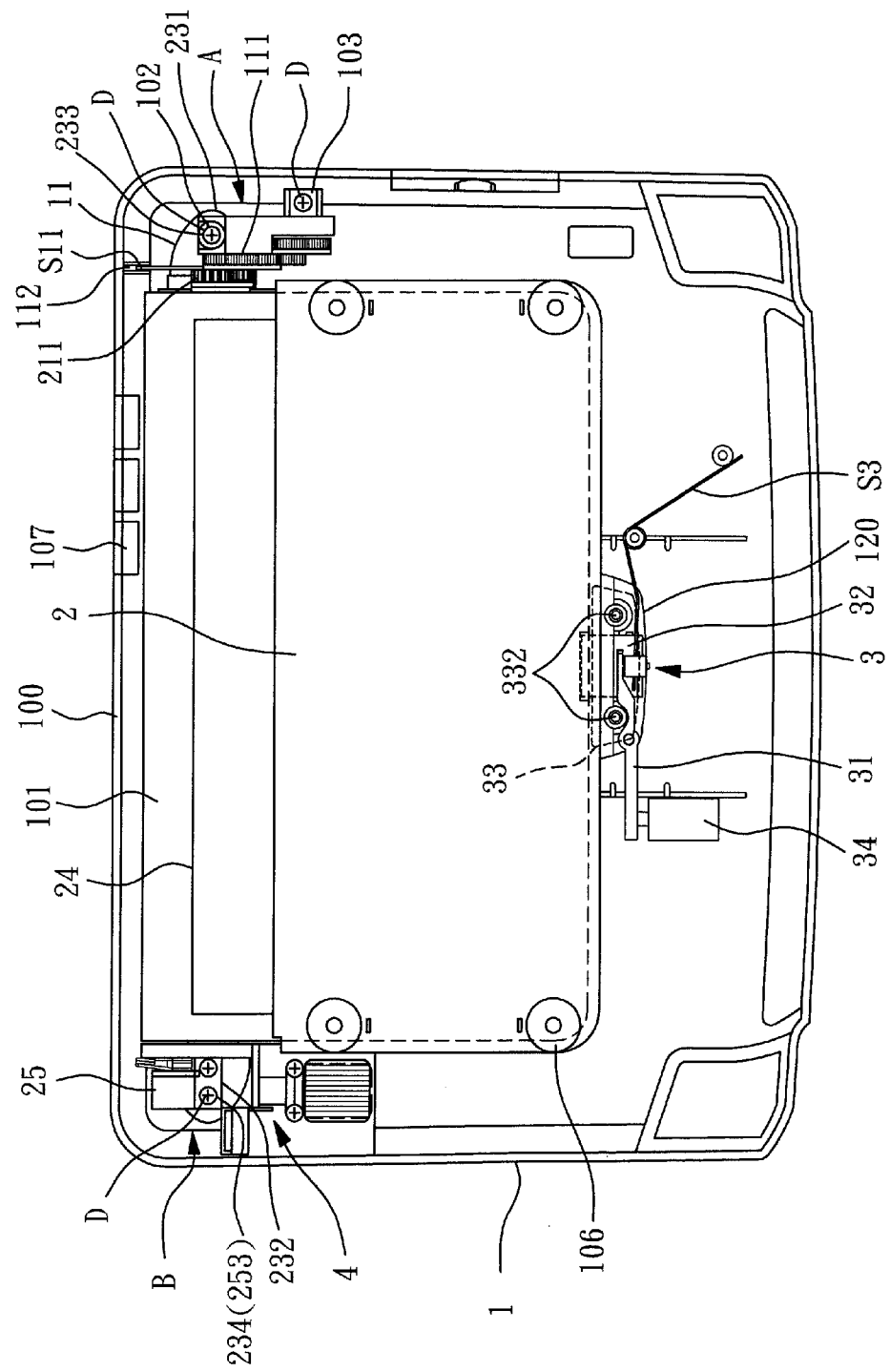
FIG. 5 is a combination diagram according to the present invention.
Figure 6:
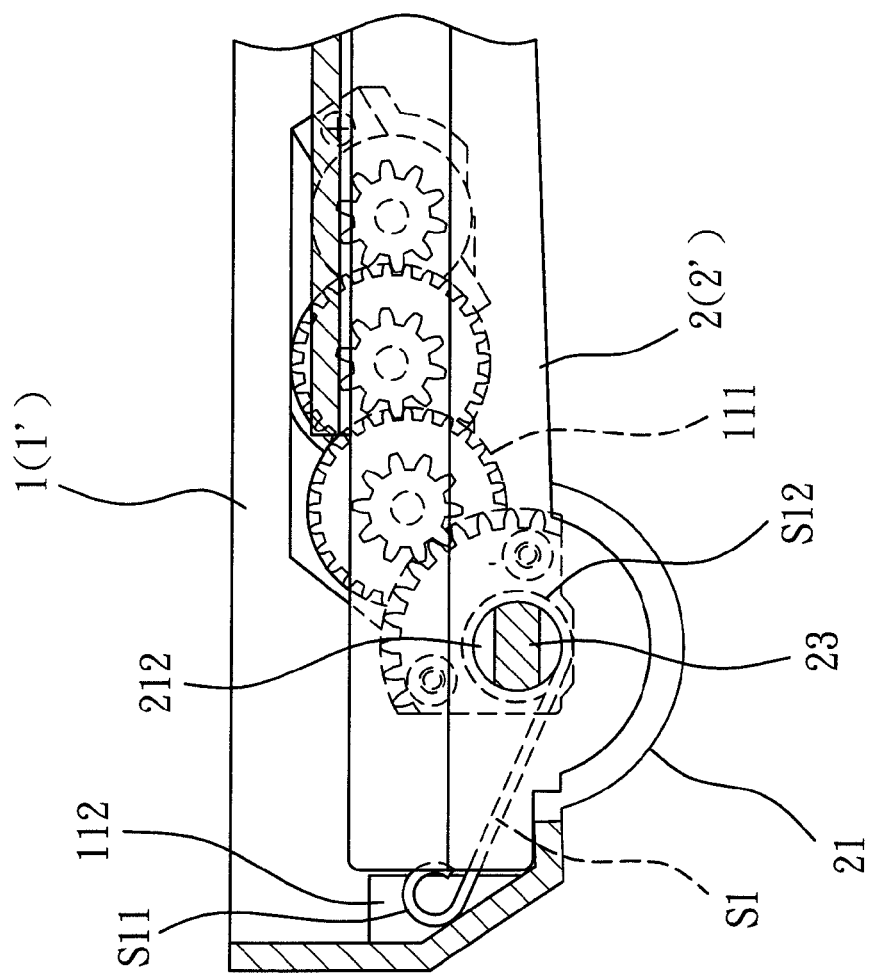
FIG. 6 is a partial combination cross-sectional diagram of the first action side according to the present invention.

The above and further objects and novel features of the invention will more fully appear from the following detailed description when the same is read in connection with the accompanying drawing. It is to be expressly understood, however, that the drawing is for purpose of illustration only and is not intended as a definition of the limits of the invention.

Please refer to FIGS. 2, 3, 4, 5, 6, the remote flip ceiling display of the present invention includes a machine body 1, a display module 2, a first action side A, a second action side B, a remote control key C1 and a control module 3.

The machine body 1 installed on a car body has multiple combination columns 106, which is provided for screws to pass through to fasten the machine body on the car body. A horizontal gap 101 set on the inner side of a lateral end 100 of the machine body 1 is provided for one lateral end 24 of the display module 2 to slip on, and a button seat 120 is set on the machine body 1. A first action side A and a second action side B are correspondingly set on two sides of the lateral end 100.

The abovementioned display module 2 is provided for displaying pictures, a clamping slot 26 and a panel 20 are set on it.

The above first action side A, which is set on one side of the lateral end 100, has a speed reducing mechanism 111 for reducing speed and buffering in the bouncing process of the display module 2 due to the action of a first elastic element S1, the first action side A includes:

a first support seat 11, which is installed and fixed on one side of the lateral end 100, and a screw D is fastened on two hole columns 102, 103. The first support seat 11 has the speed reducing mechanism 111, which is a speed reducing shaft gear set;

the first shaft hole seat 21, which is installed on one side of the lateral end 24 of the display module 2, has a shaft gear 211 on its outer peripheral for engaging the speed reducing mechanism 111, the first shaft hole seat 21 has a shaft hole 212 in its center for placing a shaft 23 passing through, a first shaft end 231 of the shaft 23 is convex to the outer side of the first shaft hole seat 21, one or more fixed holes 233 are set on the first shaft end 231 and fastened on the machine body 1 by using a corresponding screw D;

a first elastic element S1, which provides the elasticity as the power for opening and flipping the display module 2, one end S11 is passed into a notch 112 of the first support seat 11, and the body S12 is slipped into the first shaft hole seat 21 for positioning.

Figure 7:
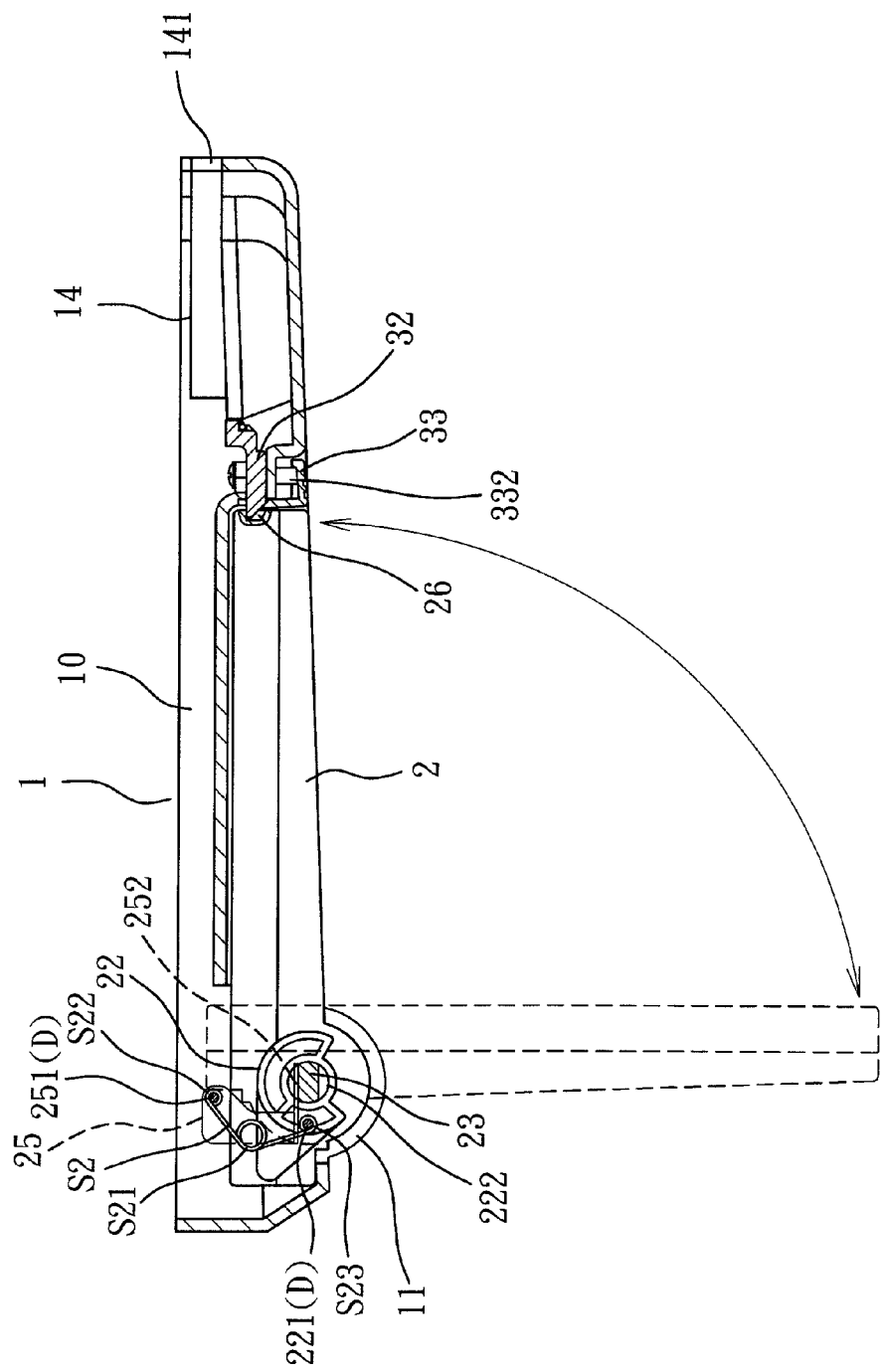
FIG. 7 is a combination cross-sectional diagram of the second action side according to the present invention.

The abovementioned second action side B, which is set on another side of the lateral side 100, and there is a second elastic element S2 located on the relative side of the first action side A, the second elastic element S2 is installed on the machine body 1, is compressed in early stage of opening the display module 2 because bearing springing force and generating corresponding suffering, and forced the display module 2 rising to the expected position by its returning elasticity in later stage, the second action side B includes:

a second shaft hole seat 22 (please refer to FIGS. 5 and 7), which is installed on one side of the lateral end 24 of the display module 2 and located on the relative side of the first shaft hole seat 21, the second shaft hole seat 22 has a shaft hole 222 in its center for placing the shaft 23 passing through, a second shaft end 232 of the shaft 23 is convex on the outer side of the second shaft hole seat 22, one or more fixed holes 234 are set on the second shaft end 232, and a screw hole 221 is set on the outer side of the second shaft hole seat 22 near the shaft hole 22;

a second support seat 25, which is a seat body corresponding to the first support seat 11, a fixed hole 251 is set on its upper section, and its lower section is a base plate 252 with one or more fixed hole 253 set on it for screwing a corresponding screw D, which is passed through the fixed hole 234 of the second shaft end 232 for fixing on the machine body 1;

a second elastic element S2, which bears buffering and leads following for opening and flipping the display module 2, has a spiral ring S21 with one or more circle in its center, a first end S22 is extended from its one end and fixed to the fixed hole 251 on the upper section of the second support seat 25 by the screw D, and a second end S23 is extended from its another end and fixed to the screw hole 221 of the second shaft hole seat 22 by the screw D.

The abovementioned remote control key C1 (please refer to FIG. 4), which is a control key set on the operation panel C of the front audio, a flip signal is sent to a electric unit 34 after pressing the remote control key C1.

Figure 8:
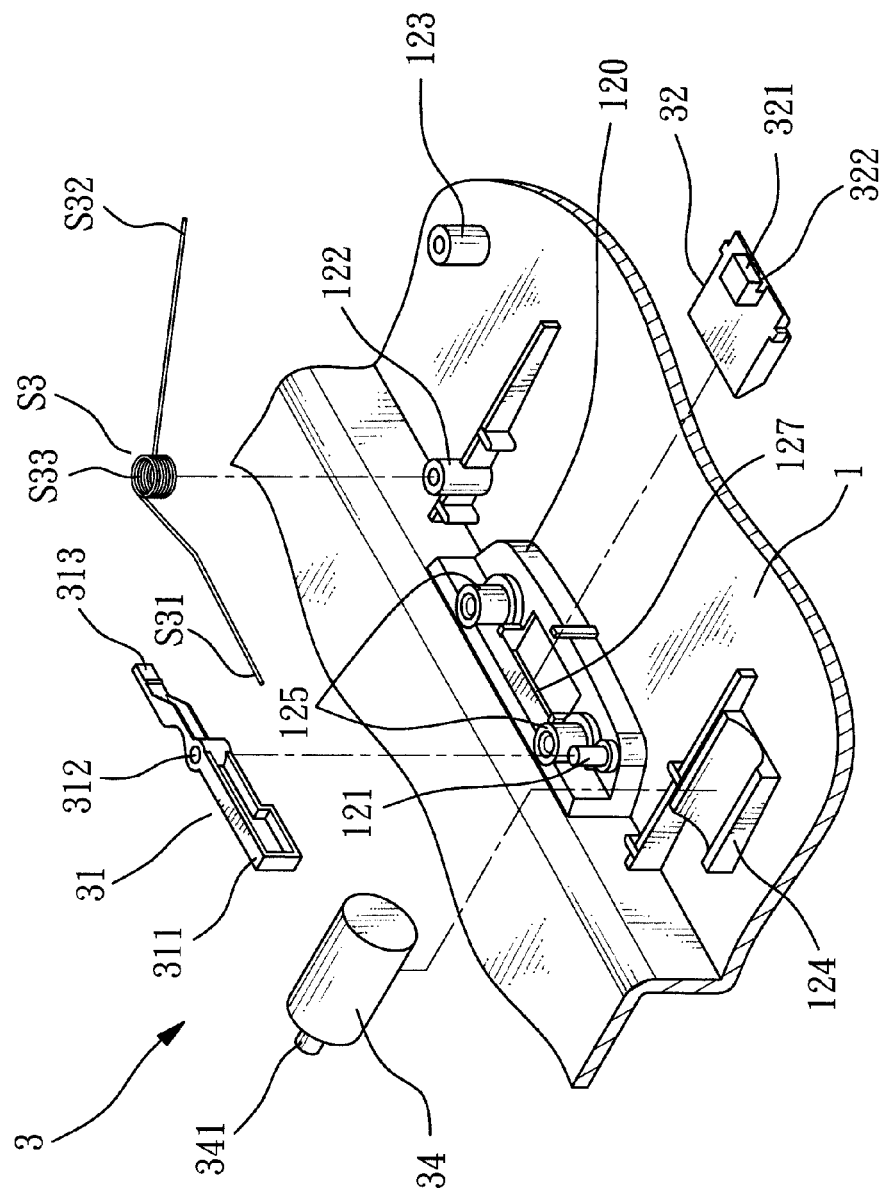
FIG. 8 is a partial three-dimensional exploded diagram of the control module according to the present invention.
Figure 9:
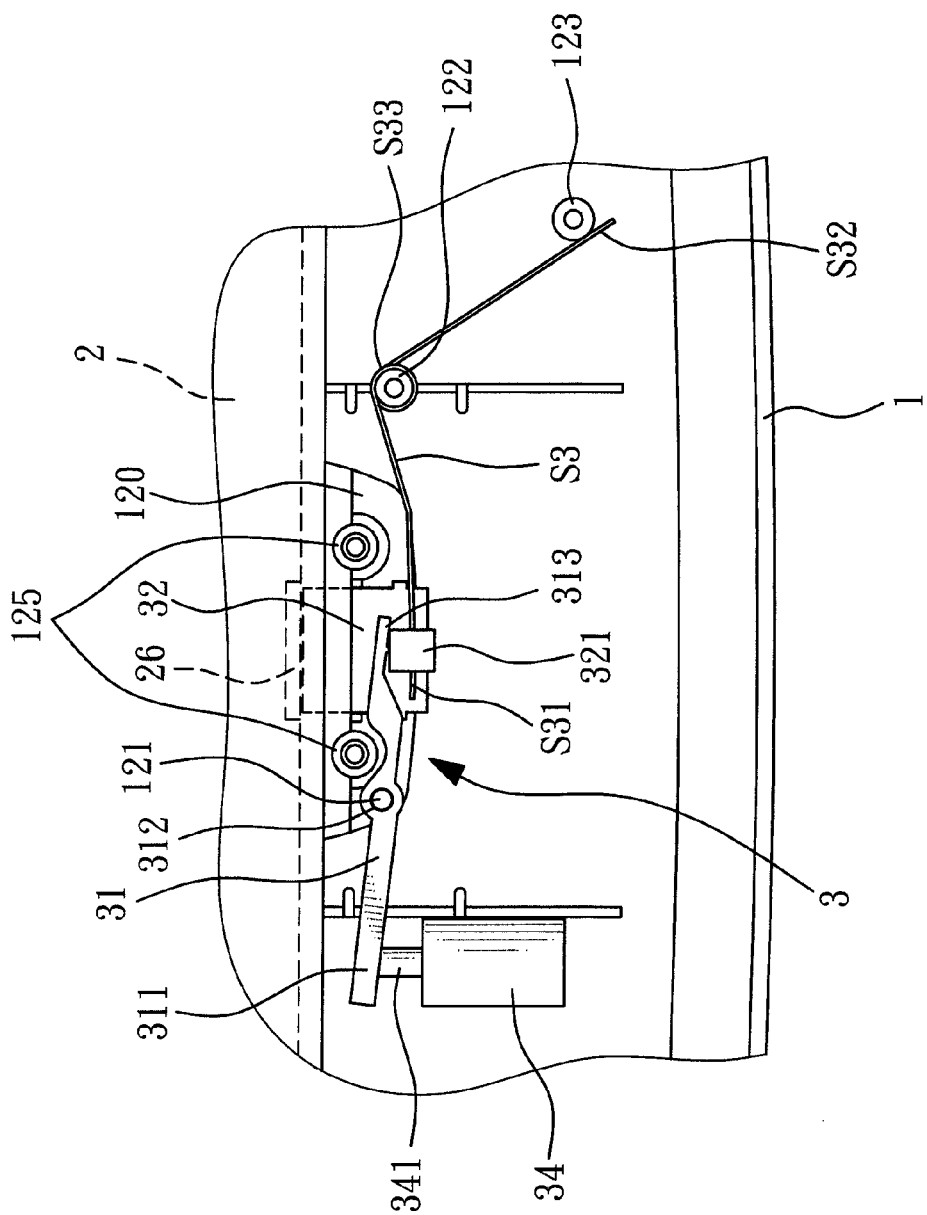
FIG. 9 is a partial cross-sectional action diagram of the control module according to the present invention.

The abovementioned control module 3 (please refer to FIGS. 5, 8, 9), which includes a lever 31, a tab 32, a third elastic element S3, a button 33 and an electric unit 34, wherein:

the level 31, a shaft hole 312 is set in its center for slipping on a first location column 121 of the machine body 1, a first end 311 of the lever 31 is connected to the electric unit 34, and a second end 313 of the lever 31 is against the tab 32;

the tab 32, a block 321 and a tab slot 322 are set on its rear side, the block 321 is against the second end 313 of the lever 3, and the tab slot 322 is used to place a front end S31 of the third elastic element S3 and forced by its elasticity to spring the tab 32 clamping to the clamping slot 26 of the display module 2 for fixing the display module 2 closed;

the third elastic element S3, a spiral ring S33 with one or more circle is slipped on a location column 122 of the machine body 1, a front end S31 of the third elastic element S3 is against the tab 32, a rear end S32 of the first elastic element S3 is positioned on a third location column 123 of the machine body 1;

the button 33, which has two convex columns 332, is slipped on two hole columns 125 of the button seat 120 of the machine body 1, a tab room 127 is set on the front side of the button seat 120 for placing the tab 32.

The electric unit 34, which is installed on a bearing seat 124 of the machine body 1 and controlled by the flip signal for driving the putting 341 on its front end to lead the first end 311 of the lever 31, to thereby link up the second end 313 of the lever 31 to push the tab 32 shrinking away from the clamping slot 26 of the display module 2, and the display module 2 is forced to flip downward.

The abovementioned third elastic element S3 is a button spring.

The abovementioned electric unit 34 is a magnetic valve or a motor.

The abovementioned machine body 1, which set a slot load multimedia player 14 (being a known multimedia player, such as a VCD player, CD player, DVD player, Blu-ray player, and the like.) installed in the space 10 of the machine body 1, and a window 141 set on the front side of the machine body 1 is provided to put disc in (please refer to FIG. 7) for playing music, films and pictures.

The abovementioned machine body 1, multiple A/V connector holes 107 (please refer to FIG. 5) are set on its side for outputting or inputting A/V signals.

By the composition of the above elements, when the front seat driver or passenger want to open the display module 2 for the rear seat passengers to watch films or pictures, pressing the remote control key C1 (namely, in the electric control way) to send a flip signal to the electric unit 34 from the remote control key C1, after receiving a flip signal, the electric unit 34 drives the putting 341 on its front end leading the first end 311 of the lever 31, to thereby link up the second end 313 of the lever 31 pushing the tab 32, the tab 32 is pushed to shrink away from the clamping slot 26 of the display module 2, the display module 2 flips downward without being fixed by the tab 32, and the rear seat passengers may watch the picture displaying on the panel 20 of the display module 2.

Besides, if users want to operate the display module 2 to flip downward in the manual control way, they can press the button 33 by fingers. Since the tab 32 is forced by the button 33 and shrunk away from the clamping slot 26, the display module 2 flips downward without being fixed by the tab 32, and the rear seat passengers may watch the picture displaying on the panel 20 of the display module 2.

Figure 10:
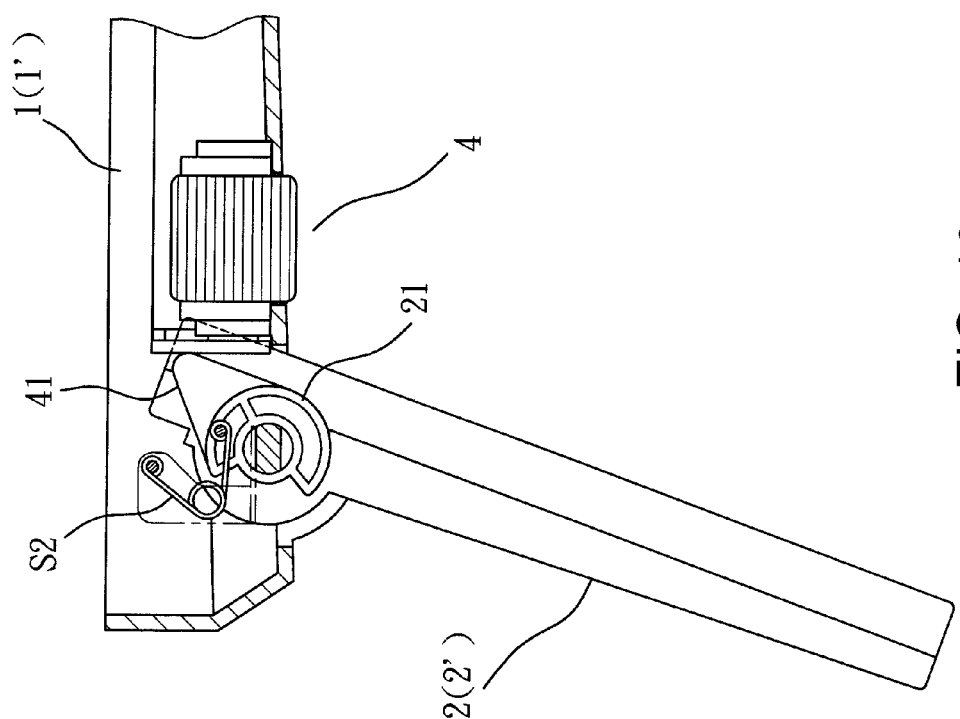
FIG. 10 is a partial cross-sectional action diagram of the adjust module according to the present invention.
Figure 11:
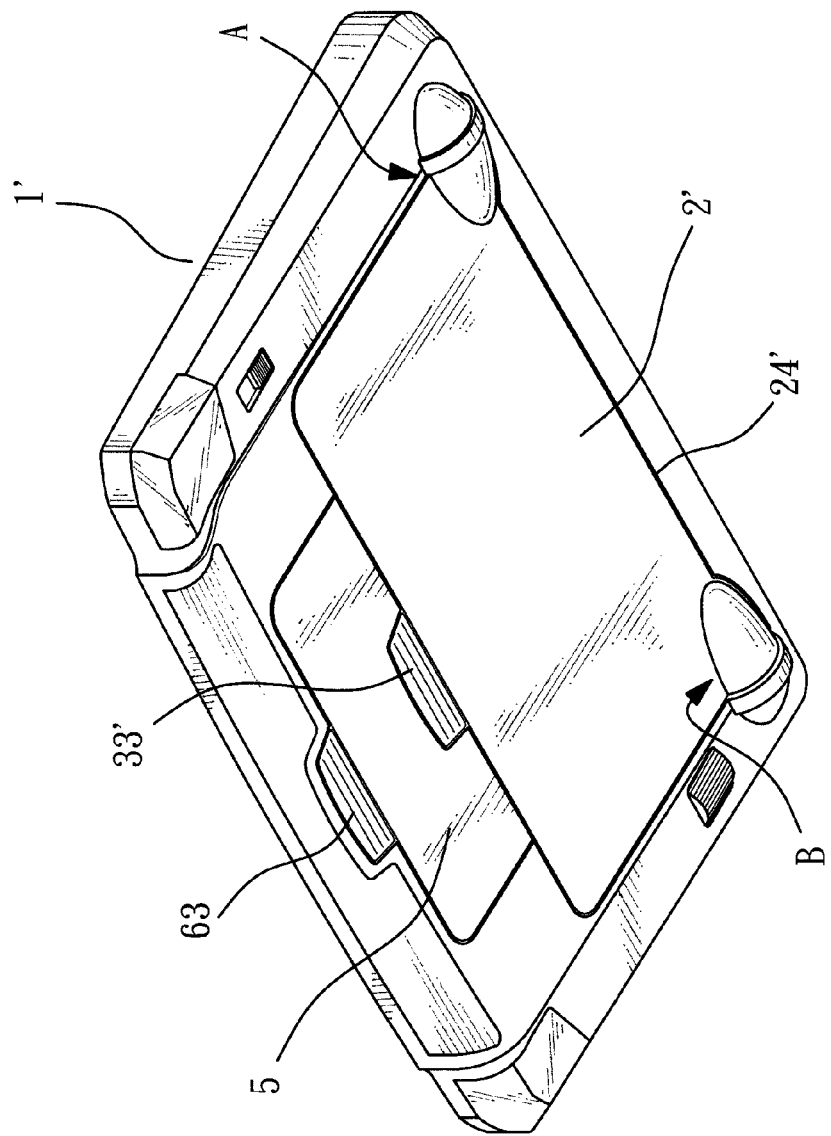
FIG. 11 is a schematic diagram of closing the display module of another embodiment of the present invention.
Figure 12:
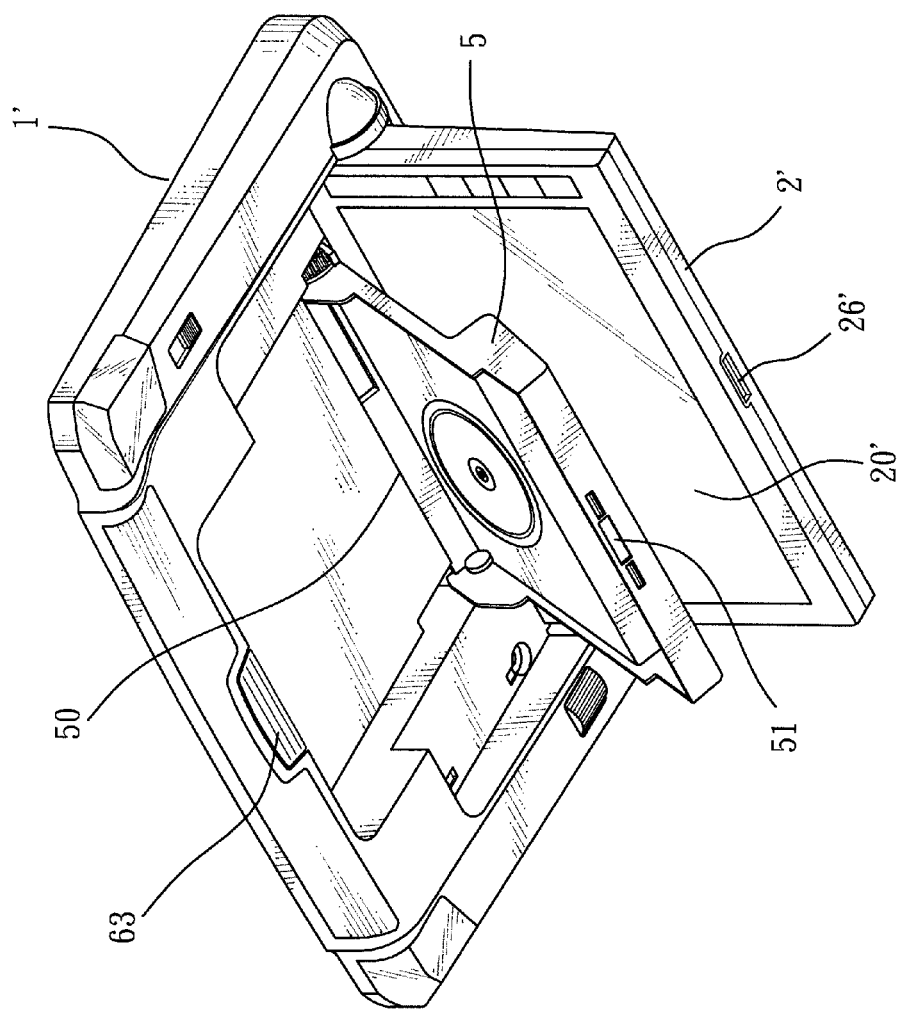
FIG. 12 is a schematic diagram of flipping the display module of another embodiment of the present invention.
Figure 13:
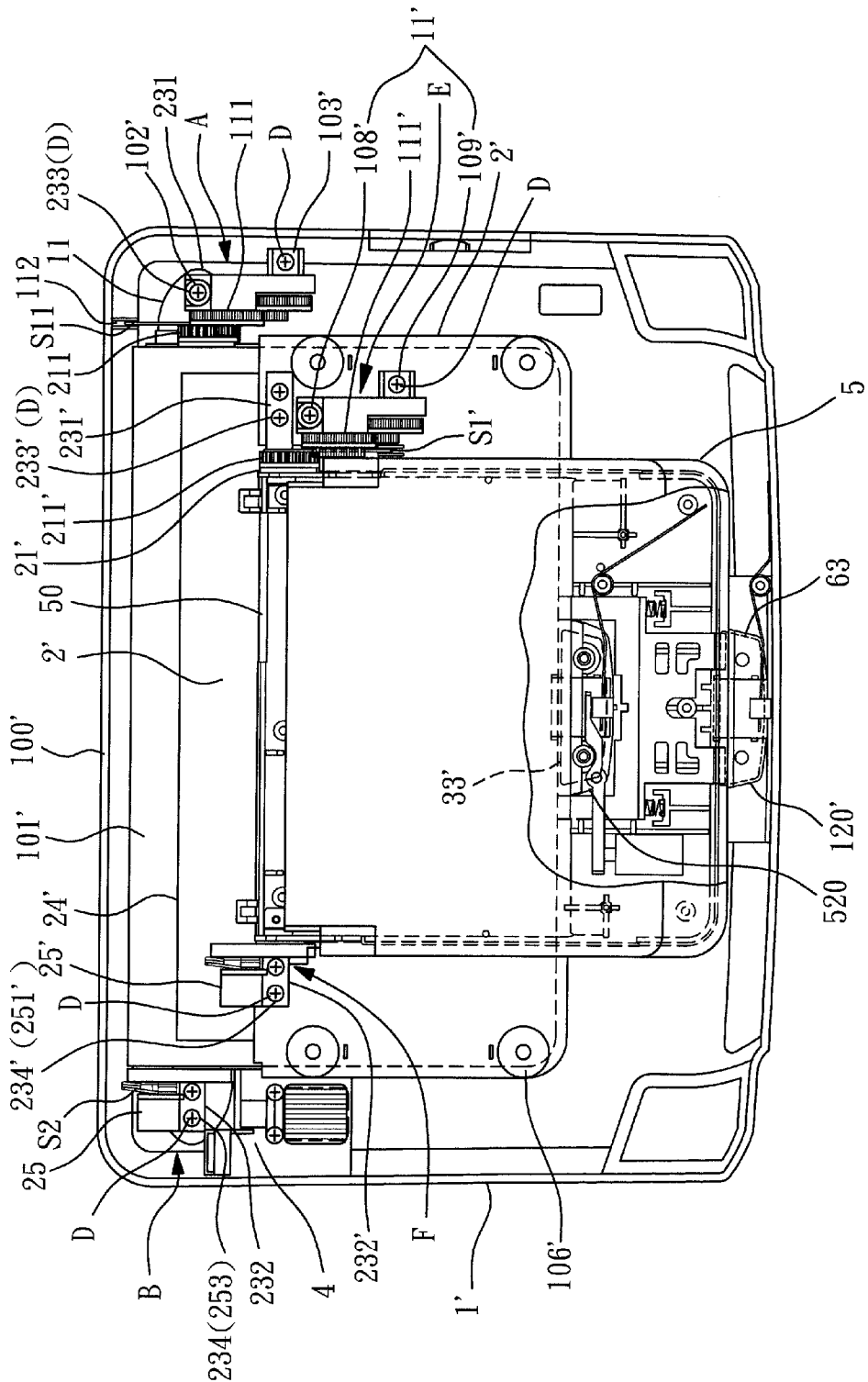
FIG. 13 is a combination diagram of another embodiment of the present invention.
Figure 14:
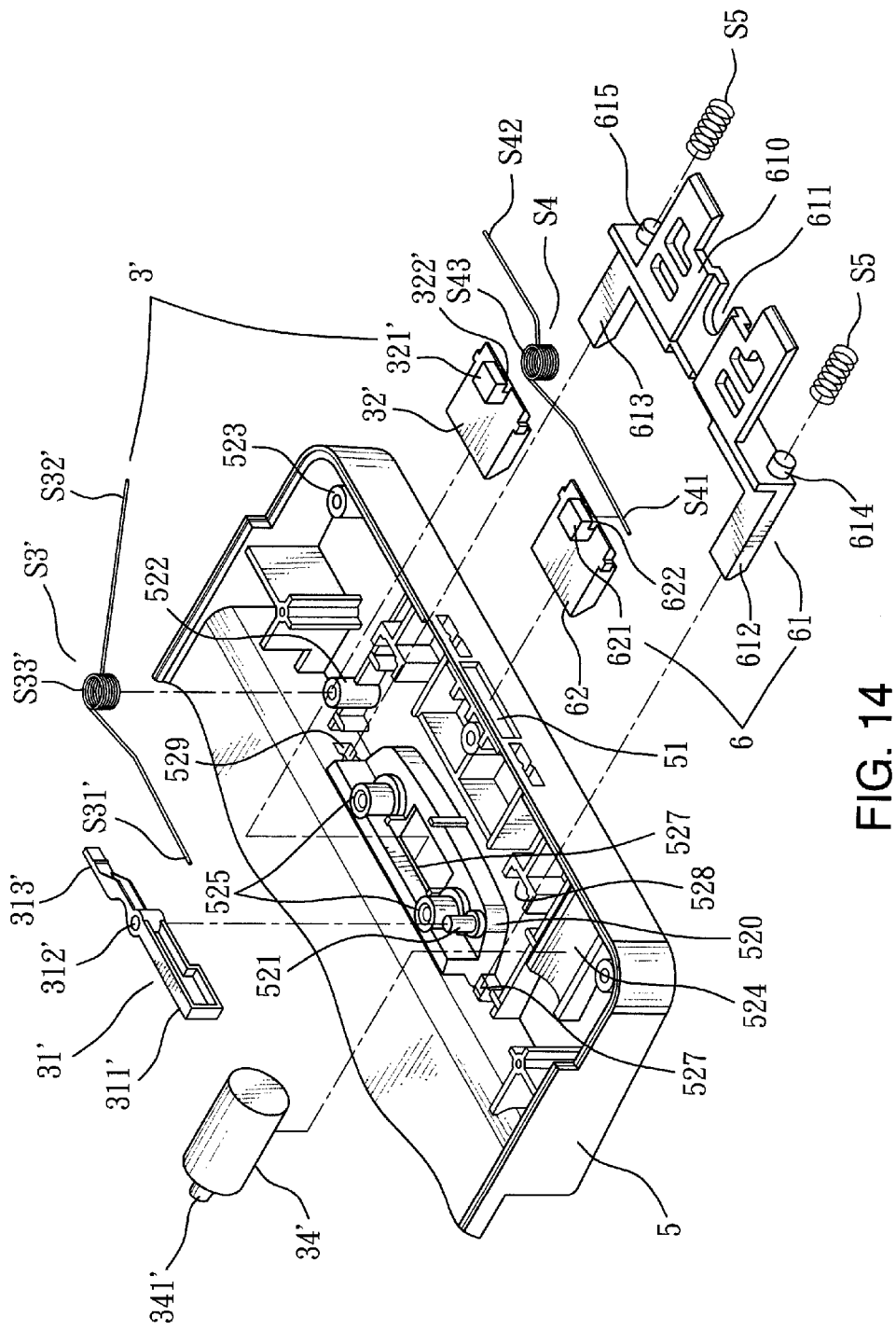
FIG. 14 is a partial three-dimensional exploded diagram of the first and second control modules of another embodiment of the present invention.

As for the machine body 1 of the present invention, an adjust module 4 is further installed (please refer to FIG. 10), the flipping angle of the display module 2 may be adjusted by turning the position of the adjust module 4 against a cam 41 on the peripheral of the first shaft hole seat 21. Since the relative structure is prior art and not the feature of the present invention, it is not illustrated here, the details may be referred to the reference TW 1239305 (U.S. Pat. No. 6,976,659 B2).

Please refer to FIGS. 11, 12, 13, 14, 15, another embodiment of the present invention includes a machine body 1', a display module 2', a flip multimedia player 5 (being a known multimedia player, such as a VCD player, CD player, DVD player, Blu-ray player, and the like.), a first action side A, a second action side B, a third action side E, a fourth action side F, a remote control key C1, a first control module 3' and a second control module 6.

The machine body 1' installed on a car body has multiple combination columns 106', which is provided for screws to pass through to fasten the machine body 1' on the car body. A horizontal gap 101' set on the inner side of the lateral end 100' of the machine body 1' is provided for one lateral end 24' of the display module 2' to slip on, and a second button seat 120' is set on the machine body 1'. A first action side A and a second action side B are corresponding set on two sides of the lateral end 100', wherein the composition and action of the first action side A and the second action side B are the same in the embodiment shown in FIGS. 2-10.

The abovementioned display module 2' is provided for displaying pictures, a first clamping slot 26' and a panel 20' are set on it.

The above flip multimedia player 5, which is provided to play music, films, pictures, a third action side E and a fourth action side F corresponding to each other are set on two sides of a lateral end 50 of the flip multimedia player 5, a first button seat 520 is set on the position corresponding to the first clamping slot 26' on the flip multimedia player 5, and a second clamping slot 51 is set on the flip multimedia player 5.

The above first action side A, which is set on one side of the lateral end 100', has a speed reducing mechanism 111 for reducing speed and buffering in the bouncing process of the display module 2' due to the action of a first elastic element S1 (the relative structure may be referred to FIG. 6 and FIG. 13), the first action side A includes:

a first support seat 11, which is installed and fixed on one side of the lateral end 100', a screw D is fastened on two hole columns 102', 103', and the first support seat 11 has the speed reducing mechanism 111, which is a speed reducing shaft gear set;

the first shaft hole seat 21, which is installed on one side of the lateral end 24' of the display module 2', has a shaft gear 211 on its outer peripheral for engaging the speed reducing mechanism 111, the first shaft hole seat 21 has a shaft hole 212 in its center for placing a shaft 23 passing through, and a first shaft end 231 of the shaft 23 is convex to the outer side of the first shaft hole seat 21, one or more fixed hole 233 is set on the first shaft end 231, and a corresponding screw D is used for fixing it on the machine body 1';

a first elastic element S1, which provides the elasticity as the power for opening and flipping the display module 2', one end S11 is passed into a notch 112 of the first support seat 11, and the body S12 is slipped into the first shaft hole seat 21 for positioning.

The above second action side B, which set on another side of the lateral end 100', and a second elastic element S2 located on the relative side of the first action side A is installed on the machine body 1', is compressed in early stage of opening the display module 2' because bearing springing force and generating corresponding suffering, and forced the display module 2' rising to the expected position by its returning elasticity in later stage (relative structure may be referred to FIGS. 13, 17), the second action side B includes:

a second shaft hole seat 22, which is set on one side of the lateral end 24' of the display module 2' and located on the relative side of the first shaft hole seat 21, a shaft hole 222 is in the center of the second shaft hole seat 22 for placing the shaft 23 passed through, a second shaft end 232 of the shaft 23 is convex to the outer side of the second shaft hole seat 22, one or more fixed holes 234 are set on the second shaft end 232, and a screw hole 221 is set on the outer side of the second shaft hole seat 22 near the position of the shaft hole 222;

a second support seat 25, which is a seat body corresponding to the first support seat 11, a fixed hole 251 is set on its upper section, its lower section is a base plate 252 with one or more fixed hole 253 set on it for screwing a screw D, which is passed through the fixed hole 234 of the second shaft end 232 for fixing on the machine body 1';

a second elastic element S2, which bears buffering and leads following for opening and flipping the display module 2', has a spiral ring S21 with one or more circle in its center, a first end S22 is extended from its one end and fixed to the fixed hole 251 on the upper section of the second support seat 25 by the screw D, and a second end S23 is extended from its another end and fixed to the screw hole 221 of the second shaft hole seat 22 by the screw D.

the third action side E, its relative structure is the same as the first action side A, which has a speed reducing mechanism 111' installed on the machine body 1' for reducing speed and buffering in the springing process suffered by the action of a fourth elastic element S1' (please refer to FIG. 13 and FIG. 17), the third action side E includes:

a third support seat 11', which is concavely installed on one side of the machine body 1', has two hole columns 108', 109', the third support seat 11' has the speed reducing mechanism 111', which is a speed reducing shaft gear set;

the third shaft hole seat 21', which is installed on one side of the lateral end 50 of the flip multimedia player 5, has a shaft gear 211' on its outer peripheral for engaging the speed reducing mechanism 111', a shaft 23' is placed in the center of the third shaft hole seat 21', a first shaft end 231' of the shaft 23' is convex to the outer side of the third shaft hole seat 21', one or more fixed holes 233' set on the third shaft end 21' is provided for fastening a screw D corresponding to the fixed hole 233' for fixing on the machine body 1;

a fourth elastic element S1', which provides the elasticity as the power for flipping the flip multimedia player 5, is passed in the third support seat 11'.

The fourth action side F, which relative structure is the same as the second action side B, has a fifth elastic element S2' set on the machine body 1', is compressed in early stage of opening the flip multimedia player 5 because bearing springing force and generating corresponding suffering, and forced the flip multimedia player 5 rising to the expected position by its returning elasticity in later stage (please refer to FIGS. 13, 17), the fourth action side F includes:

a fourth shaft hole seat 22', which is set on one side of the lateral end 50 of the flip multimedia player 5 and located on the relative side of the third shaft hole seat 21', the center of the fourth shaft hole seat 22' is provided for placing the shaft 23' passed through, a second shaft end 232' of the shaft 23' is convex to the outer side of the fourth shaft hole seat 22', one or more fixed holes 234' are set on the second shaft end 232', and a screw hole 221' is set on the outer side of the fourth shaft hole seat 22' near the position of the shaft hole 22';

a fourth support seat 25', which is concavely installed on another side of the machine body 1' and corresponds to the third support seat 11', one or more fixed holes 251' set on it is provided for a corresponding screw D to screw in and pass through the fixed hole 234' of the second shaft end 232' for fixing on the machine body 1';

a fifth elastic element S2', which bears buffering and leads following for opening and flipping the flip multimedia player 5, has a spiral ring S21' with one or more circle in its center, a first end S22' is extended from its one end and fixed to the fourth support seat 25' by the screw D, and a second end S23' is extended from its another end and fixed to the fourth shaft hole seat 22' by the screw D.

The abovementioned remote control key C1 (please refer to FIG. 4), which is a control key set on the operation panel C of the front audio, a flip signal is sent to a electric unit 34' after pressing the remote control key C1.

The abovementioned first control module 3' (please refer to FIGS. 13, 14, 15), which includes a lever 31', a first tab 32', a sixth elastic element S3', a first button 33' and an electric unit 34', wherein:

the level 31', a shaft hole 312' is set in its center for slipping on a fourth location column 521 of the flip multimedia player 5, a first end 311' of the lever 31' is connected to the electric unit 34', and a second end 313' of the lever 31' is against the first tab 32';

the first tab 32', a first block 321' and a first tab slot 322' are set on its rear side, the first block 321' is against the second end 313' of the lever 3', the first tab slot 322' is used to place the front end S31' of the sixth elastic element S3' and forced by its elasticity to spring the tab 32' clamping to the clamping slot 26' of the display module 2' for fixing the display module 2' closed;

the sixth elastic element S3', a spiral ring S33' with one or more circle set in its center is slipped on a location column 522 of the flip multimedia player 5, a first front end S31' of the sixth elastic element S3' is against the first tab 32', and a rear end S32' of the sixth elastic element S3' is positioned to a sixth location column 523 of the flip multimedia player 5;

the first button 33', which has two convex column 332' slipped on two hole columns 525 of the first button seat 520 of the flip multimedia player 5, a first tab room 527 is set on the front side of the first button seat 520 for placing the first tab 32', the first button 33' is provided for being pressed to push the first tab 32' for shrinking away from the first clamping slot 26' of the display module 2', and the display module 2' is forced to flip downward;

the electric unit 34', which is fixed on a bearing seat 524 in the flip multimedia player, is provided to be controlled by a flip signal to drive the putting 341' on its front end leading the first end 311' of the lever 31', to thereby link up the second end 313' of the lever 31' to push the first tab 32' for shrinking away from the first clamping slot 26' of the display module 2', and the display module 2' is forced to flip downward.

The second control device 6, which includes a backup plate 61, a second tab 62, a seventh elastic element S4, at least an eighth elastic element S5 and a second button 63, wherein:

the backup plate 61, which is installed on the peripheral of the first button seat 520 inside the flip multimedia player 5, is provided for being pushed by the display module 2' to clamp the second button 63, to limit flipping the flip multimedia player 5, a sliding hole 611 concavely installed in the center of the front edge of the body 610 of the backup plate 61 is limited by a limit column G of the flip multimedia player 5, at least a parallel slide 612 and at least a location column 614 are set on two sides of the body 610, the at least a location column 614 is slipped on one end of the eighth elastic element S5;

the second tab 62, a second block 621 and a second tab slot 622 are set on its rear side, the tab slot 622 is used for placing the front end S41 of the seventh elastic element S4 and forced by its elasticity to spring the second tab 62 clamping to the second clamping slot 51 of the flip multimedia player 5 for fixing the flip multimedia player 5 closed;

the seventh elastic element S4, a second spiral ring S43 set on its body is slipped on a second location column 522 of the machine body 1', a second front end S41 of the seventh elastic element S4 is against the second tab 62, a second rear end S42 of the seventh elastic element S4 is located on a location column 523 of the machine body 1';

the eight elastic element S5, one end is slipped on the location column 614 and another end is against a limit groove 528 of the flip multimedia player 5, is forced at least a slide 612 of the backup plate 61 to stretch at least a lateral opening 529 of the flip multimedia player 5 by its elasticity.

the second button 63, which has two convex columns 632, the two convex columns 632 are slipped on two hole columns 125' of two second button seats 120' of the machine body 1', and a first tab room 127' is set on the front side of the second button seat 120' for placing the second tab 62.

The feature is that the display module 2' may push the backup plate 61 when the display module 2' is fixed by the first tab 32', and the backup plate 61 is pushed out to clamp to the second button 63. At the time, if the second button 63 is pressed, the second tab 62 is shrunk if pressing the second button 63, because the backup plate 61 is pushed to clamp to the second button 63, the flip multimedia player 5 does not flip downward for preventing error action; after the display module 2' flips downward and the backup plate 61 is pushed away, pressing the second button 63 to flip the flip multimedia player 5 for putting disc in.

The abovementioned sixth elastic element S3' and the seventh elastic element S4 are button springs.

The abovementioned electric unit 34' is a magnetic valve or a motor.

Figure 15:
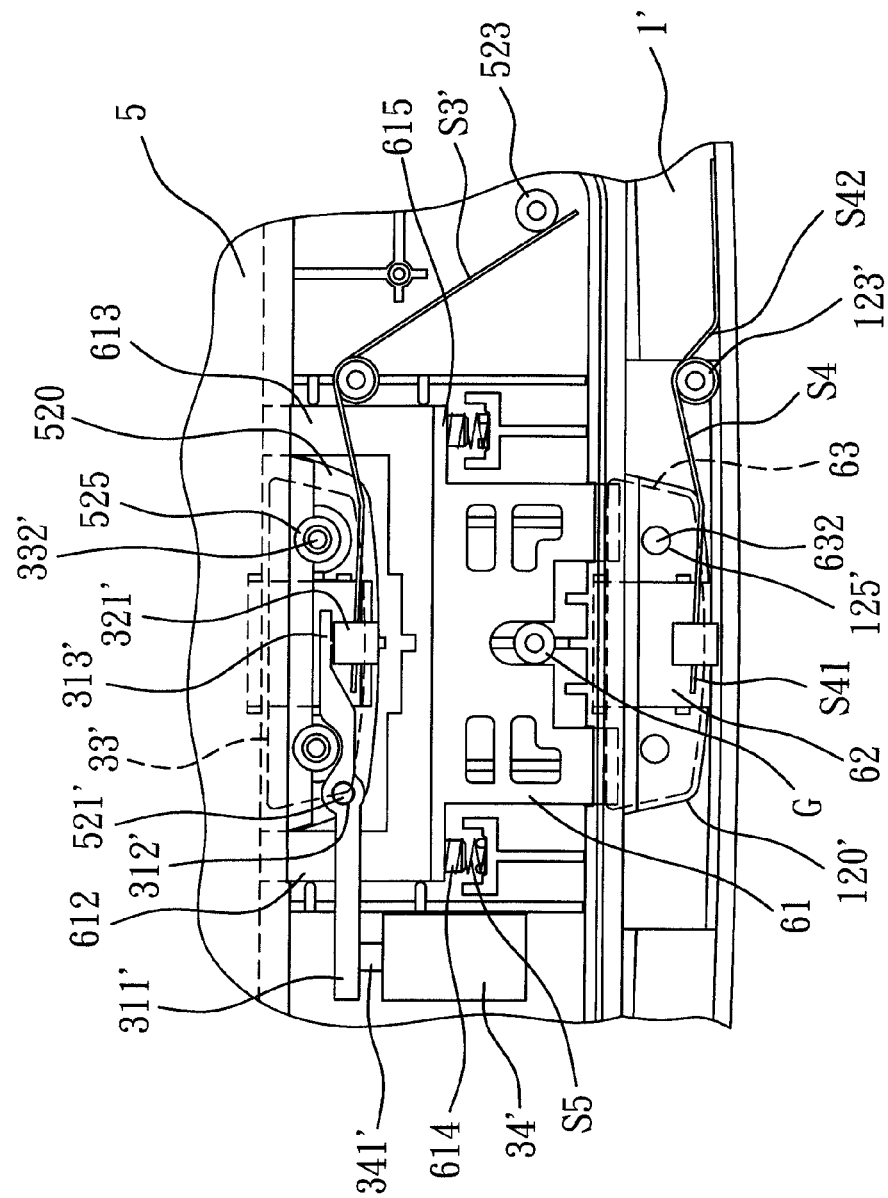
FIG. 15 is a partial cross-sectional diagram (1) of the first and second control modules of another embodiment of the present invention.
Figure 16:
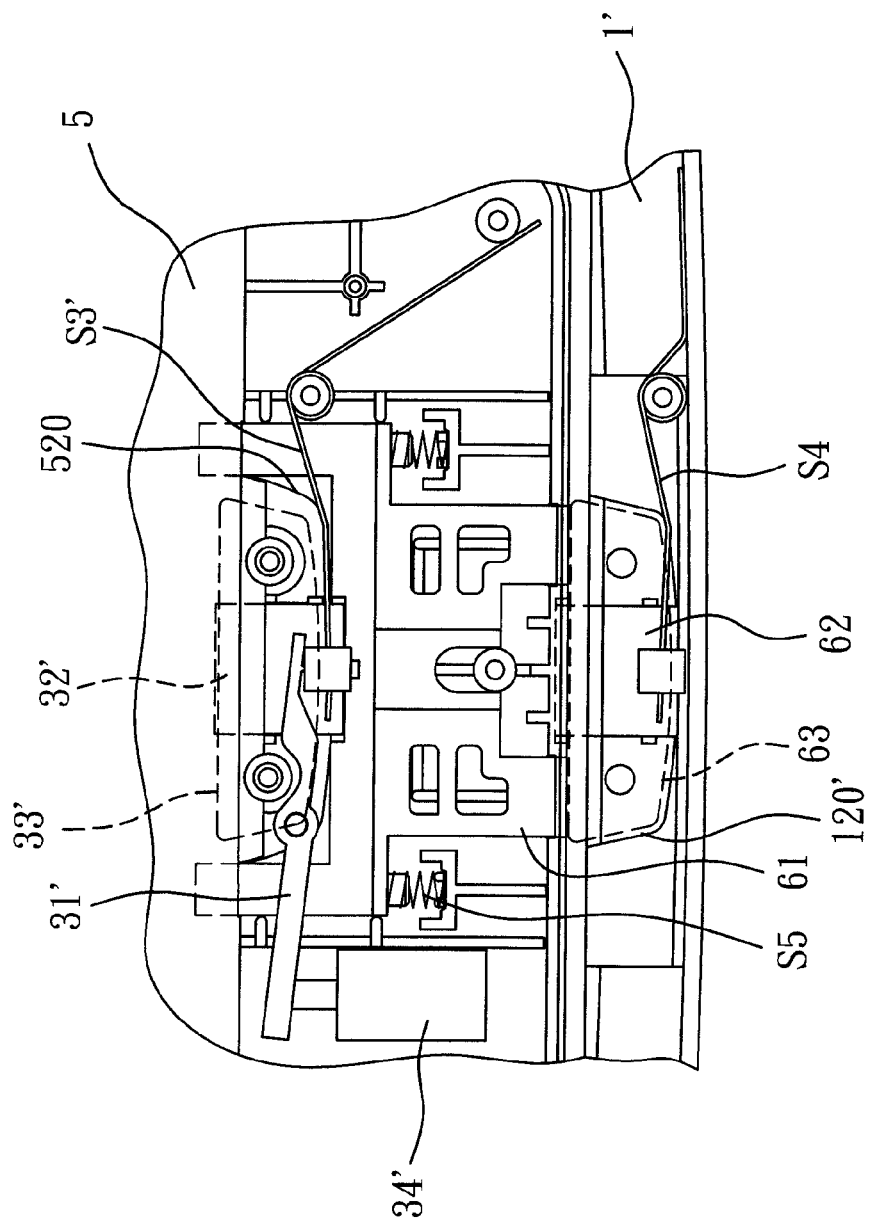
FIG. 16 is a partial cross-sectional diagram (2) of the first and second control modules of another embodiment of the present invention.
Figure 17:
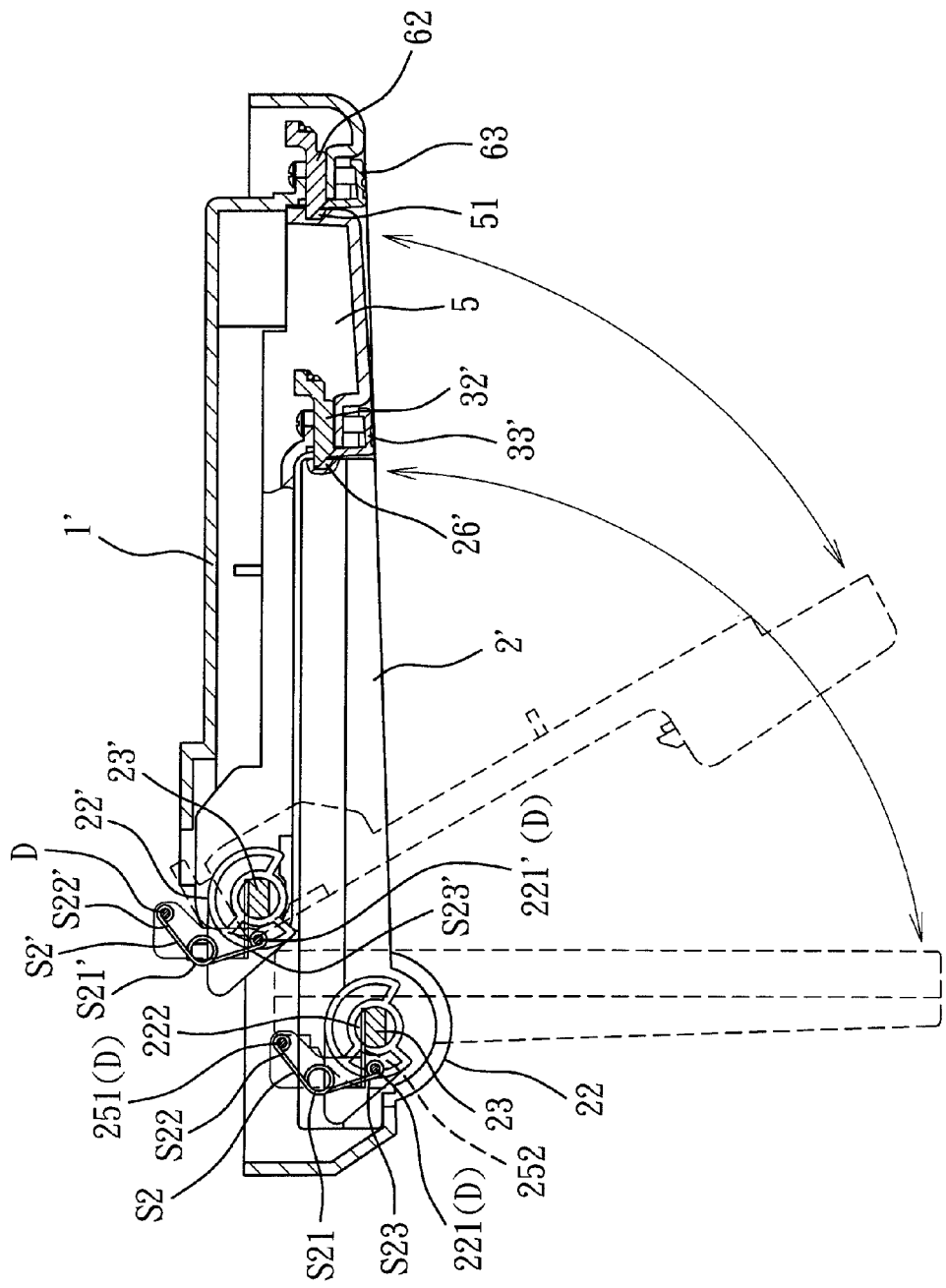
FIG. 17 is a cross-sectional action diagram of another embodiment of the present invention.

Please refer to FIGS. 15, 16, 17, by the composition of above elements, when the front seat driver or passenger want to open the display module 2 for the rear seat passengers to watch films or pictures, pressing the remote control key C1 (namely, in the electric control way) to send a flip signal to the electric unit 34' from the remote control key C1, after receiving a flip signal, the electric unit 34' drives the putting 341' on its front end leading the first end 311' of the lever 31', to thereby link up the second end 313' of the lever 31' pushing the first tab 32', the first tab 32' is pushed to shrink away from the first clamping slot 26' of the display module 2', the display module 2' flips downward without being fixed by the first tab 32', and the rear seat passengers may watch the picture displaying on the panel 20' of the display module 2'.

Besides, if users want to operate the display module 2' to flip downward in the manual control way, they can press the first button 33' by fingers. Since the first tab 32' is forced by the first button 33' and shrunk away from the first clamping slot 26', the display module 2' flips downward without being fixed by the first tab 32', and the rear seat passengers may watch the picture displaying on the panel 20' of the display module 2'.

After the display module 2' is flipped downward, users may press the second button 63 if want to play disc, and the flip multimedia player 5 flips downward. Since the second tab 62 is forced by the second button 63 and shrunk away from the second clamping slot 51, the flip multimedia player 5 flips downward without being fixed by the second tab 62 for putting disc.

As for the machine body 1 of the present invention, an adjust module 4 is further installed (please refer to FIG. 10), the flipping angle of the display module 2 may be adjusted by turning the position of the adjust module 4 against a cam 41 on the peripheral of the first shaft hole seat 21. Since the relative structure is prior art and not the feature of the present invention, it is not illustrated here, the details may be referred to the reference TW 1239305 (U.S. Pat. No. 6,976,659 B2).

Above all, the invention may increase the interaction between the front audio and the display module by using the fixing way of the original mechanical tab, and a control module is added. The driver may press the remote control key of the front audio, to control the control module pushing the tab, and the display module is flipped with it for the rear seat passengers watching, which is innovative and progressive.

I claim:

1. A remote flip ceiling display, which includes a machine body, a display module, a first action side, a second action side, a third action side, a fourth action side, a remote control key, a first control module and a second control module, wherein:

the machine body, which is installed on a car body, the inner surface of its one lateral end is provided for the display module to slip its one side on, a second button seat is set on the machine body, and a first action side and a second side are correspondingly set on two sides of the lateral end;

the display module, which is provided to display pictures, a first clamping slot and a panel are set on it;

the flip multimedia player, a third action side and a fourth action side corresponding to each other are set on two sides of a lateral end of the flip multimedia player, a first button seat is set on the position corresponding to the first clamping slot on the flip multimedia player, and a second clamping slot is set on the flip multimedia player;

the first action side, which is set on one side of the lateral end, has a speed reducing mechanism for reducing speed and buffering in the bouncing process due to the action of a first elastic element;

the second action side, which is set on another side of the lateral end and located on the relative side of the first action side, has a second elastic element installed on the machine body, the second elastic element is compressed in early stage of opening the display module because bearing springing force and generating corresponding suffering, and forced the display module to rise to the expected position by its returning elasticity in later stage;

the third action side, which has a speed reducing mechanism installed on the machine body for reducing speed and buffering in the springing process suffered by the action of a fourth elastic element;

the fourth action side, which has a fifth elastic element installed on the machine body, the fifth elastic element is compressed in early stage of opening the flip multimedia player because bearing springing force and generating corresponding suffering, and forced the flip multimedia player to rise to the expected position by its returning elasticity in later stage;

the remote control key, which is a control key, is provided for pressing to send a flip signal;

the first control module, which includes a lever, a first tab, a sixth elastic element, a first button and an electric unit, wherein:

the lever, which is slipped on the flip multimedia player;

the first tab, which is against the lever, is sprung by the elasticity of the sixth elastic element to clamp to the first clamping slot of the display module;

the sixth elastic element, which is slipped on the flip multimedia player, a first front end of the sixth elastic element is against the first tab, and a first rear end of the sixth elastic is positioned on the flip multimedia player;

the first button, which is slipped on the first button seat of the flip multimedia player, is provided for pressing to push the first tab leaving away from the first clamping slot of the display module, to thereby flip the display module downward;

the electric unit, which is installed inside the flip multimedia player for controlling by the flip signal to drive the putting on its front end leading the lever, to push the first tab shrinking away from the first clamping slot of the display module, and the display module is forced to flip downward;

the second control device, which includes a backup plate, a second tab, a seventh elastic element, at least a eighth elastic element and a second button, wherein:

the backup plate, which is installed inside the flip multimedia player, is provided for being pushed by the display module to clamp the second button, to limit flipping the flip multimedia player;

the second tab, which is forced by the elasticity of the seventh elastic element to spring the second tab to clamp into the second clamping slot of the flip multimedia player for providing the fixing of closing the flip multimedia player;

the seventh elastic element, which is slipped on the machine body, a second front end of the seventh elastic element is against the second tab, a rear end of the seventh elastic element is positioned on the machine body;

the eighth elastic element, which is forced at least a slide of the backup plate to stretch at least a lateral opening of the flip multimedia player by its elasticity;

the second button, which is slipped on the second button seat of the machine body, is provided to being pressed to push the second tab away from the second clamping slot of the flip multimedia player, to flip the flip multimedia player downward;

the feature is:

the display module is fixed by the first tab, the display module pushes the backup plate, the backup plate is pushed to clamp to the second button, at the time, the second tab is shrunk if pressing the second button, because the backup plate is pushed to clamp to the second button, the flip multimedia player does not flip downward for preventing error action; after the display module flips downward and the backup plate is pushed away, pressing the second button to flip the flip multimedia player.

2. The remote flip ceiling display as claimed in claim 1, wherein the electric unit is a magnetic valve.

3. The remote flip ceiling display as claimed in claim 1, wherein the electric unit is a motor.

4. The remote flip ceiling display as claimed in claim 1, wherein the remote control key is set on a front audio, a flip signal is sent to the electric unit when pressing the remote control key.

5. The remote flip ceiling display as claimed in claim 1, wherein the sixth element and the seventh elastic element are button springs.

6. The remote flip ceiling display as claimed in claim 1, wherein an adjust module is installed on the machine body for adjusting the flipping angle of the display module.

* * * * *